US012057078B1

(12) United States Patent
Qiu et al.

(10) Patent No.: US 12,057,078 B1
(45) Date of Patent: Aug. 6, 2024

(54) BACKLIGHT REGULATING CIRCUIT, DISPLAY APPARATUS AND BACKLIGHT REGULATING METHOD

(71) Applicant: HKC CORPORATION LIMITED, Shenzhen (CN)

(72) Inventors: Bin Qiu, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/454,535

(22) Filed: Aug. 23, 2023

(30) Foreign Application Priority Data

Mar. 27, 2023 (CN) ........................ 202310339460.6

(51) Int. Cl.
*G09G 3/34* (2006.01)

(52) U.S. Cl.
CPC ... *G09G 3/3406* (2013.01); *G09G 2320/0247* (2013.01); *G09G 2320/0686* (2013.01); *G09G 2330/021* (2013.01)

(58) Field of Classification Search
CPC ...... G09G 3/2007–2029; G09G 3/3406–3426; G09G 2300/0421; G09G 2300/0426; G09G 2310/0243; G09G 2310/027; G09G 2310/0272; G09G 2310/0289; G09G 2310/06; G09G 2310/08; G09G 2320/0233; G09G 2320/0238; G09G 2320/0247; G09G 2320/0626–0633; G09G 2320/0686; G09G 2330/021
See application file for complete search history.

(56) References Cited

U.S. PATENT DOCUMENTS

2006/0164359 A1* 7/2006 Kimura ................ G09G 3/2014 345/92
2009/0201244 A1* 8/2009 Park ..................... G09G 3/3611 345/102
2017/0090225 A1* 3/2017 Asahi ....................... G09G 3/36
2019/0215924 A1* 7/2019 Navabi-Shirazi .... G09G 3/3406
2023/0266162 A1* 8/2023 Fu ......................... G01J 1/4204 356/218

FOREIGN PATENT DOCUMENTS

EP 2785146 A1 * 10/2014 ........... G09G 3/3406
WO WO-2015117124 A1 * 8/2015 ......... H05B 33/0815
WO WO-2016061409 A1 * 4/2016 ........... G09G 3/3426

* cited by examiner

*Primary Examiner* — Nathan Danielsen
(74) *Attorney, Agent, or Firm* — Hodgson Russ LLP

(57) ABSTRACT

A backlight regulating circuit includes a first dimming circuit, a second dimming circuit and a selecting circuit, where the first dimming circuit is configured to conduct a PWM signal line and a driving chip in response to a signal of the scanning signal line; the second dimming circuit is configured to conduct a DC signal line and the driving chip in response to the signal of the scanning signal line; the first dimming circuit and the second dimming circuit are connected to the scanning signal line through the selecting circuit; and the selecting circuit is configured to proportionally distribute the signal of the scanning signal line to the first dimming circuit and the second dimming circuit in response to a control signal dynamically output by a control signal line according to an image.

18 Claims, 6 Drawing Sheets

BACKLIGHT REGULATING CIRCUIT, DISPLAY APPARATUS AND BACKLIGHT REGULATING METHOD

CROSS-REFERENCE TO RELATED APPLICATIONS

This application claims priority to Chinese Patent Application No. 202310339460.6, filed on Mar. 27, 2023, the entire disclosure of which are incorporated herein by reference.

TECHNICAL FIELD

The present disclosure belongs to the field of display, and in particular to a backlight regulating circuit, a display apparatus and a backlight regulating method.

BACKGROUND

At present, more and more display products use a mini LED as a backlight for display. Generally, the mini LED serves as a direct type backlight, a distance between light beads of the mini LED is very small, and local dimming in a smaller range can be realized through a large number of densely light beads. A backlight board of the mini LED can accommodate more LEDs in a unit of area, thereby greatly increasing the number of the backlights. Compared with the traditional backlight design, higher brightness uniformity and higher color contrast degree can be achieved in a smaller light mixing distance, thereby realizing ultra-thin design of a terminal product and saving electric power.

The traditional mini LED backlight control technology generally adopts partitioned control, for example, a one-to-one control mode, that is, each control subregion respectively corresponds to a string of LEDs, that is, each control light region corresponds to a control channel of a constant-current driving chip; therefore, regional brightness adjustment can be designed, the LED is turned off in an individual region, complete black is achieved, and power consumption is reduced; and due to the increased number of LEDs in a unit of area, ultra-high contrast degree and refined dynamic distribution are realized, a bright field is brighter, a dark field is darker, and the display effect is more exquisite.

For the mini LED backlight, data transmission and control between a constant-current control system of a backlight light bar or light panel and a mainboard are realized mainly through a digital signal, and the traditional single low-frequency pulse width modulation (PWM) dimming is used for brightness control of a backlight assembly.

SUMMARY

There are provided a backlight regulating circuit, a display apparatus, and a backlight regulating method, according to embodiments of the present disclosure. The technical solution is as below:

According to one aspect of the present disclosure, there is provided a backlight regulating circuit, including a first dimming circuit, where the first dimming circuit is connected to a scanning signal line, a PWM signal line and a driving chip, and is configured to conduct the PWM signal line and the driving chip in response to the scanning signal line. The backlight regulating circuit further includes:

- a second dimming circuit, connected to the scanning signal line, a DC signal line and the driving chip, and configured to conduct the DC signal line and the driving chip in response to the signal of the scanning signal line; and
- a selecting circuit, connected to a control signal line, the scanning signal line, the first dimming circuit and the second dimming circuit, where the first dimming circuit and the second dimming circuit are connected to the scanning signal line through the selecting circuit, and the selecting circuit is configured to proportionally distribute the signal of the scanning signal line to the first dimming circuit and the second dimming circuit in response to a control signal dynamically output by the control signal line according to an image.

According to a second aspect of the present disclosure, there is provided a display apparatus, including:

- a backlight assembly, including a driving board, a light string, a driving chip, and the backlight regulating circuit, where the backlight regulating circuit, the light string and the driving chip are arranged on the driving board; the backlight regulating circuit, the driving chip and the light string are connected sequentially; and the light string includes a plurality of lamp beads connected in series.

According to a third aspect of the present disclosure, there is provided a backlight regulating method. The backlight regulating method is applied to the display apparatus. The display apparatus further includes a logic circuit. The backlight control method further includes:

- detecting a data signal and parsing the data signal into a displayed image, and determining the type of the displayed image according to the dynamic range of the displayed image, where the displayed image is one of relatively low dynamic image, medium dynamic image and high dynamic image;
- in a case that the displayed image is determined as the low dynamic image, controlling a voltage output by the logic circuit to a control signal line to be greater than or equal to a first voltage to make a first dimming circuit conduct a PWM signal line and a driving chip;
- in a case that the displayed image is determined as the medium dynamic image, controlling the voltage output by the logic circuit to the control signal line to be greater than a second voltage and less than the first voltage to make the first dimming circuit conduct the PWM signal line and the driving chip and make a second dimming circuit conduct a DC signal line and the driving chip; and
- in a case that the displayed image is determined as the high dynamic image, controlling the voltage output by the logic circuit to the control signal line to be less than or equal to the second voltage to make the second dimming circuit conduct the DC signal line and the driving chip.

Other characteristics and advantages of the present disclosure will become apparent from the following detailed description, or will be partially learned through the practice of the present disclosure.

It should be understood that the above general description and the following detailed description are only exemplary and explanatory, and cannot limit the disclosure.

BRIEF DESCRIPTION OF DRAWINGS

The accompanying drawings, which are incorporated in and constitute a part of this specification, illustrate embodiments consistent with the present disclosure and, together with the description, serve to explain the principles of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

Exemplary embodiments are described more comprehensively hereinafter with reference to the accompanying drawings. However, the exemplary embodiments can be implemented in various forms and should not be construed as being limited to the examples described herein; on the contrary, these embodiments are provided, so that the present disclosure will be more comprehensive and complete, and the concept of the exemplary embodiments will be completely conveyed to those skilled in the art.

In addition, the features, structures, materials or characteristics described may be combined in any one or more embodiments in any suitable manner. In the following description, numerous specific details are provided to give a sufficient understanding of the embodiments of the present disclosure. However, those skilled in the art will realize that the technical solutions of the present disclosure may be practiced without one or more of the specific details, or other methods, components, apparatuses, steps and the like may be adopted. In other cases, well-known methods, apparatuses, implementations or operations will not be shown or described in details to avoid obscuring aspects of the present disclosure.

The present disclosure is further described in more detail below with reference to the accompanying drawings and the specific embodiments. It should be noted that the technical features involved in the various embodiments of the present disclosure described below may be combined with each other as long as they do not constitute a conflict with each other. The examples described below with reference to the accompanying drawings are exemplary, and are only used to explain the present disclosure but should not be construed as a limitation to the present disclosure.

Embodiment 1

Figure 1:
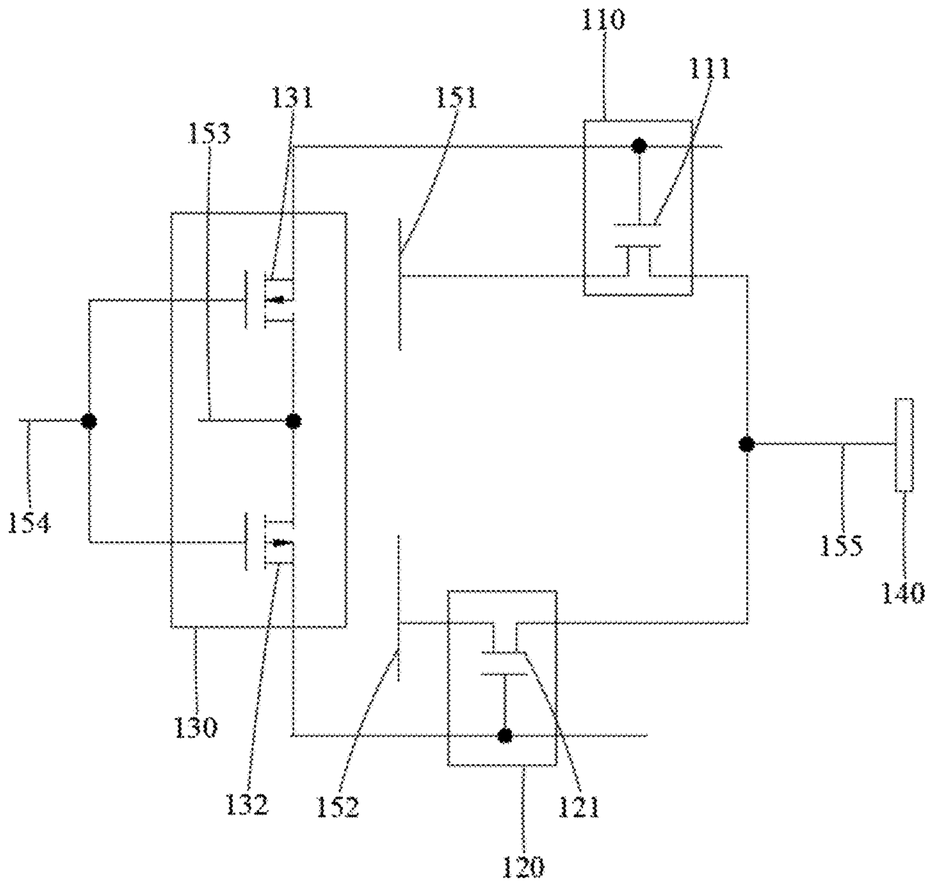
FIG. 1 is a schematic structural diagram of a backlight regulating circuit according to Embodiment 1 of the present disclosure.

As shown in FIG. 1, a backlight regulating circuit in this embodiment includes a first dimming circuit 110, a second dimming circuit 120 and a selecting circuit 130.

The first dimming circuit 110 is connected to a scanning signal line 153, a PWM signal line 151 and a driving chip 140. The first dimming circuit 110 and the driving chip 140 are connected through an output signal line 155. The scanning signal line 153 outputs a scanning signal Sn. The first dimming circuit 110 is configured to conduct the PWM signal line 151 and the driving chip 140 in response to the scanning signal line 153.

The second dimming circuit 120 is connected to the scanning signal line 153, a DC signal line 152 and the driving chip 140. The second dimming circuit 120 and the driving chip 140 are connected through the output signal line 155. The second dimming circuit 120 is configured to conduct the DC signal line 152 and the driving chip 140 in response to the scanning signal line 153.

The selecting circuit 130 is connected to the control signal line 154, the scanning signal line 153, the first dimming circuit 110 and the second dimming circuit 120. The first dimming circuit 110 and the second dimming circuit 120 are connected to the scanning signal line 153 through the selecting circuit 130. The selecting circuit 130 is configured to proportionally distribute a signal of the scanning signal line 153 to the first dimming circuit 110 and the second dimming circuit 120 in response to the control signal line 154 according to a control signal dynamically output by an image.

Figure 2:
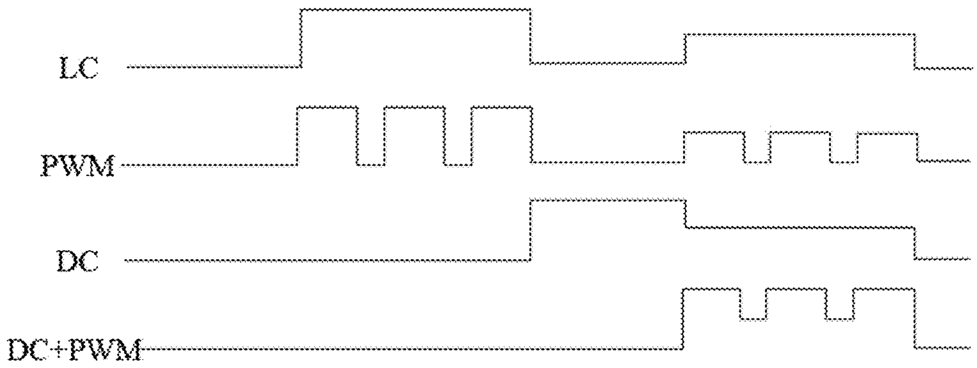
FIG. 2 is a schematic diagram of input and output signals of a backlight regulating circuit according to Embodiment 1 of the present disclosure.

Referring to FIG. 2, the signal of the scanning signal line 153 is proportionally distributed to the first dimming circuit 110 and the second dimming circuit 120, that is, in a case that all the signals of the scanning signal line 153 are distributed to the first dimming circuit 110, the PWM signal line 151 and the output signal line 155 are conducted, and the output signal line 155 only outputs a PWM dimming signal to the driving chip 140; in a case that all the signals of the scanning signal line 153 are distributed to the second dimming circuit 120, the DC signal line 152 and the output signal line 155 are conducted, and the output signal line 155 only outputs a DC dimming signal to the driving chip 140; and in a case that some of the signals of the scanning signal line 153 are distributed to the first dimming circuit 110 and some of the signals are distributed to the second dimming circuit 120, the PWM signal line 151 and the DC signal line 152 are conducted with the output signal line 155, and the output signal line 155 outputs the PWM dimming signal and the DC dimming signal to the driving chip 140 at the same time.

Figure 3:
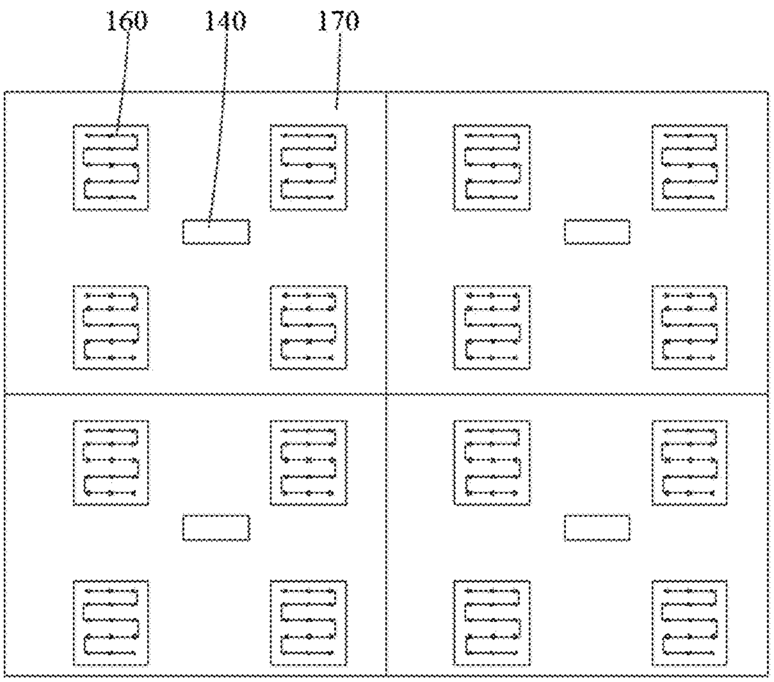
FIG. 3 is a schematic structural diagram of a backlight assembly according to Embodiment 1 of the present disclosure.

Referring to FIG. 3, the backlight assembly 100 includes a driving board 170, a light string 160 and a driving chip 140. The light string 160 and the driving chip 140 are arranged on the driving board 170. Each driving chip 140 has a plurality of control channels. Each of the control channels are configured to control the current magnitude of each light string 160. Each light string 160 is composed of a plurality of light beads connected in series. The light beads may include an LED light, a mini LED light and a micro LED light.

In this embodiment, the backlight regulating circuit includes a first dimming circuit 110, a second dimming circuit 120 and a selecting circuit 130, where the first dimming circuit 110 is configured to conduct a PWM signal line 151 and a driving chip 140 in response to a signal of the scanning signal line 153; the second dimming circuit 120 is configured to conduct a DC signal line 152 and the driving chip 140 in response to the signal of the scanning signal line 153; and the selecting circuit 130 is configured to proportionally distribute the signal of the scanning signal line 153 to the first dimming circuit 110 and the second dimming circuit 120 in response to a control signal dynamically output by a control signal line 154 according to an image, so that the dimming mode of a backlight assembly 100 can be switched flexibly among PWM dimming, DC dimming and PWM+DC mixed dimming according to the dynamic range of the displayed image, thereby reducing or eliminating flickering of the displayed picture and improving the display quality of the display panel 400.

Exemplarily, referring to FIG. 1, the selecting circuit 130 includes a first transistor 131 and a second transistor 132. One of the first transistor 131 and the second transistor 132 is a P-type transistor and the other one of the first transistor 131 and the second transistor 132 is an N-type transistor. A control terminal of the first transistor 131 and a control terminal of the second transistor 132 are connected to the control signal line 154; a first terminal of the first transistor 131 and a first terminal of the second transistor 132 are connected to the scanning signal line 153; a second terminal of the first transistor 131 is connected to the first dimming circuit 110; and a second terminal of the second transistor 132 is connected to the second dimming circuit 120.

When being turned on, the transistors work in a saturation region; and when being turned off, the transistors work in a cut-off region. One of the first transistor 131 and the second transistor 132 is a P-type transistor and the other one of the first transistor 131 and the second transistor 132 is an N-type transistor. When the first transistor 131 is turned on, the second transistor 132 is turned off; and when the first transistor 131 is turned off, the second transistor 132 is turned on.

The control terminal of the first transistor 131 is a grid electrode, the first terminal of the first transistor 131 is a source electrode, and the second terminal of the first transistor 131 is a drain electrode. The control terminal of the second transistor 132 is a grid electrode, the first terminal of the second transistor 132 is a source electrode, and the second terminal of the second transistor 132 is a drain electrode.

The selecting circuit 130 includes the first transistor 131 and the second transistor 132. One of the first transistor 131 and the second transistor 132 is the P-type transistor and the other one of the first transistor 131 and the second transistor 132 is the N-type transistor. According to such design, the first transistor 131 is turned on and the second transistor 132 is turned off, and the output signal line 155 only outputs the PWM dimming signal to the driving chip 140; or the first transistor 131 is turned off and the second transistor 132 is turned on, the output signal line 155 only outputs the DC dimming signal to the driving chip 140.

Referring to FIG. 1, the first transistor 131 is the N-type transistor, and the second transistor 132 is the P-type transistor. In a case that an output voltage of the control signal line 154 is greater than or equal to a first voltage, the first transistor 131 works in a saturation region, and the second transistor 132 works in a cut-off region. In a case that the output voltage of the control signal line 154 is less than or equal to a second voltage, the first transistor 131 works in the cut-off region, the second transistor 132 works in the saturation region. In a case that the output voltage of the control signal line 154 is greater than the second voltage and less than the first voltage, the first transistor 131 and the second transistor 132 work in a variable resistance region.

That is, in a case that the output voltage of the control signal line 154 is greater than the second voltage and less than the first voltage, the first transistor 131 and the second transistor 132 are not turned on completely, the first dimming circuit 110 controls the magnitude of a PWM dimming voltage, the second dimming circuit 120 controls the magnitude of a DC dimming voltage, and the output signal line 155 outputs the PWM dimming signal and the DC dimming signal to the driving chip 140 at the same time.

In a case that the output voltage of the control signal line 154 is greater than or equal to the first voltage, the output signal line 155 only outputs the PWM dimming signal to the driving chip 140. For a low dynamic image, PWM dimming can reduce power consumption. In a case that the output voltage of the control signal line 154 is less than or equal to the second voltage, the output signal line 155 only outputs the DC dimming signal to the driving chip 140. For a high dynamic image, DC dimming can eliminate flickering of the displayed picture. In a case that the output voltage of the control signal line 154 is greater than the second voltage and less than the first voltage, the output signal line 155 outputs the PWM dimming signal and the DC dimming signal to the driving chip 140 at the same time. For a medium dynamic image, flickering of the displayed picture can be reduced or eliminated while power consumption is reduced to a certain degree.

Referring to FIG. 1, the first dimming circuit 110 includes a third transistor 111; the third transistor 111 is connected to a second terminal of the first transistor 131; a first terminal of the third transistor 111 is connected to the PWM signal line 151; and a second terminal of the third transistor 111 is connected to the driving chip 140. A control terminal of the third transistor 111 is a grid electrode, the first terminal of the third transistor 111 is a source electrode, and the second terminal of the third transistor 111 is a drain electrode.

The first dimming circuit 110 includes the third transistor 111. In a case that the output voltage of the control signal line 154 is greater than or equal to the first voltage, the third transistor 111 is turned on completely, the output signal line 155 only outputs the PWM dimming signal to the driving chip 140. In a case that the output voltage of the control signal line 154 is greater than the second voltage and less than the first voltage, the third transistor 111 is not turned on completely, that is, the third transistor 111 works in the variable resistance region, and the third transistor 111 controls the voltage magnitude of the PWM dimming signal.

Referring to FIG. 1, the second dimming circuit 120 includes a fourth transistor 121; the fourth transistor 121 is connected to a second terminal of the second transistor 132; a first terminal of the fourth transistor 121 is connected to the DC signal line 152; and a second terminal of the fourth transistor 121 is connected to the driving chip 140. A control terminal of the fourth transistor 121 is a grid electrode, the first terminal of the fourth transistor 121 is a source electrode, and the second terminal of the fourth transistor 121 is a drain electrode.

The second dimming circuit 120 includes the fourth transistor 121. In a case that output voltage of the control signal line 154 is less than the second voltage, the fourth transistor 121 is turned on completely, the output signal line 155 only outputs the DC dimming signal to the driving chip 140. In a case that the output voltage of the control signal line 154 is greater than the second voltage and less than the first voltage, the fourth transistor 121 is not turned on completely, that is, the fourth transistor 121 works in the variable resistance region, and the fourth transistor 121 controls the voltage magnitude of the DC dimming signal.

Embodiment 2

Figure 4:
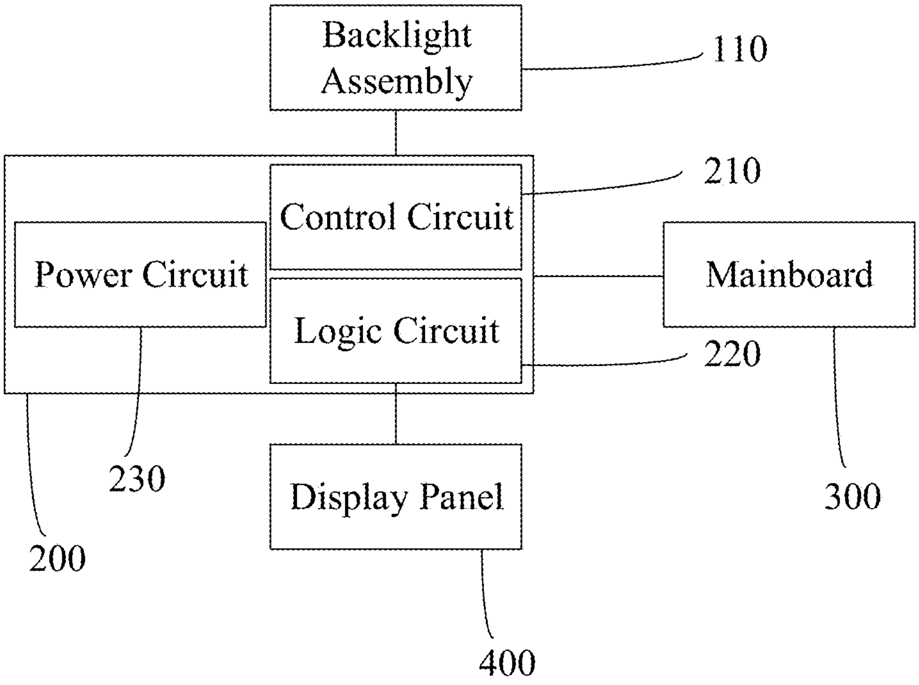
FIG. 4 is a schematic structural diagram of a display apparatus according to Embodiment 2 of the present disclosure.
Figure 5:
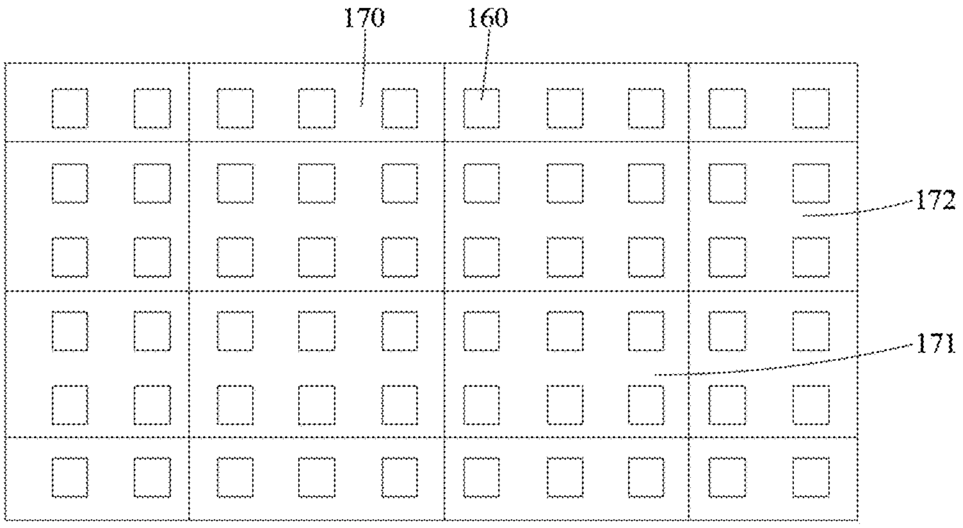
FIG. 5 is a schematic structural diagram of a backlight assembly according to Embodiment 2 of the present disclosure.

Referring to FIG. 3 to FIG. 5, the display apparatus includes a backlight assembly 100 and a control assembly 200 which are connected to each other. The backlight assembly 100 includes a driving board 170, a light string 160, a driving chip 140 and a backlight regulating circuit. The backlight regulating circuit includes the backlight regulating circuit disclosed in Embodiment 1. The backlight regulating circuit, the light string 160 and the driving chip 140 are arranged on the driving board 170. The backlight regulating circuit, the driving chip 140 and the light string 160 are connected to each other sequentially, and the light string 160 includes a plurality of light beads connected in series.

The control assembly 200 includes a logic circuit 220. The logic circuit 220 controls a control signal of the backlight regulating circuit, including a PWM dimming signal of a PWM signal line 151, a DC dimming signal of a DC signal line 152, a scanning signal Sn of a scanning signal line 153, and a control signal LC of a control signal line 154.

It should be noted that the backlight regulating circuit may be arranged on the driving board 170, but is not limited to this. The backlight regulating circuit may also be arranged on the logic circuit 220, depending on the situation.

The display apparatus includes the backlight assembly 100; in the backlight assembly 100, the backlight regulating circuit, the driving chip 140 and the light string 160 are connected to each other sequentially; the control signal line 154, according to the control signal dynamically output by the image, controls the backlight regulating circuit to output the PWM dimming signal, the DC dimming signal or the PWM+DC dimming signal to the driving chip 140 to drive the light string 160, so that the dimming mode of the backlight assembly 100 can be switched flexibly among PWM dimming, DC dimming and PWM+DC mixed dimming according to the dynamic range of the displayed image, thereby reducing or eliminating flickering of the displayed picture and improving the display quality of the display panel 400.

As shown in FIG. 3 to FIG. 5, the driving board 170 includes at least one primary subregion 171 and at least one secondary subregion 172 surrounding all subregions 171; each of the primary subregion 171 and the secondary subregion 172 includes the driving chip 140 and at least one light string 160; and the at least one primary subregion 171 further includes the backlight regulating circuit.

For the display apparatus, especially a large-size mini LED backlight display apparatus, the backlight assembly 100 may perform partitioned dimming. For the secondary subregion 172, but not limited to this, the secondary subregion 172 may perform dimming by the backlight regulating circuit, depending on the situation. For the primary subregion 171, the backlight regulating circuit may be used for dimming, which can be switched flexibly among PWM dimming, DC dimming and PWM+DC mixed dimming according to the dynamic range of the displayed image.

The effective view region of the large-size display apparatus is mainly concentrated in the middle region of a screen, that is, during watching, the eye attention of a user is mainly concentrated in the middle region of the screen, and the eye attention of the user is distracted for the edge region of the screen. For the secondary subregion 172, PWM dimming may be adopted to reduce power consumption; and for the primary subregion 171, the backlight regulating circuit may be used for dimming, that is, dimming may be switched flexibly among PWM dimming, DC dimming and PWM+DC mixed dimming according to the dynamic range of the displayed image, thereby reducing or eliminating flickering of the displayed picture and improving the display quality of the display apparatus.

Referring to FIG. 3 to FIG. 5, the display apparatus further includes a mainboard 300 and a display panel 400; and the control assembly 200 is connected to the mainboard 300, the display panel 400 and the backlight assembly 100. The mainboard 300 is at least configured to supply power to the control assembly 200 and detect a data signal; the control assembly 200 includes a control circuit 210, a logic circuit 220 and a power circuit 230; the control circuit 210 is at least configured to control on and off of the light string 160; the logic circuit 220 is at least configured to control the backlight regulating circuit according to the data signal detected by the mainboard 300; and the power circuit 230 is at least configured to convert an input voltage of the mainboard 300 to supply power to the backlight assembly 100 and the display panel 400.

The mainboard 300 detects the data signal and parses the data signal as a displayed image, the logic circuit 220 outputs a signal to the control signal line 154 according to the dynamic range of the displayed image, the dimming mode of the primary subregion 171 is controlled to be flexibly switched among PWM dimming, DC dimming and PWM+DC mixed dimming, thereby reducing flickering of the displayed picture, improving the display quality of the display apparatus, and reducing power consumption to a certain degree.

Embodiment 3

Figure 6:
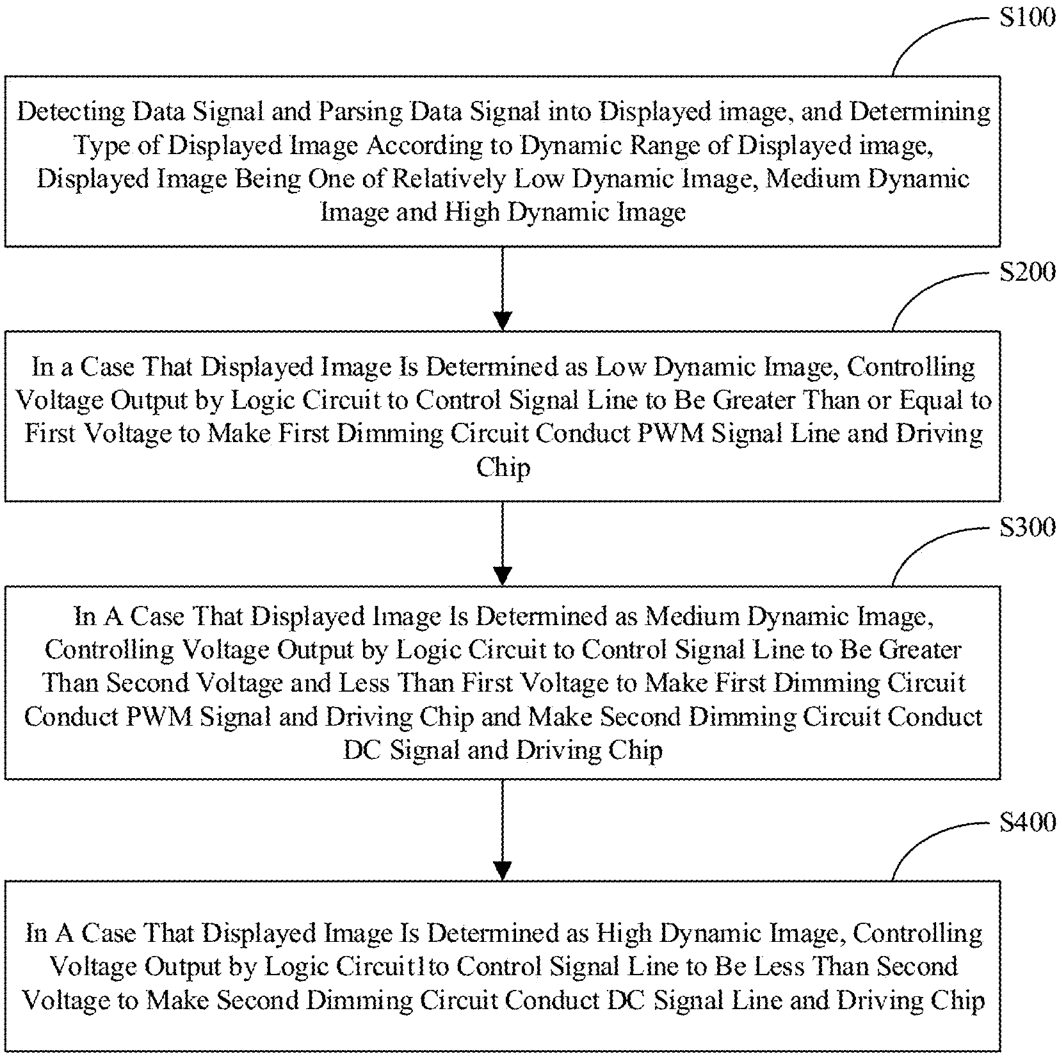
FIG. 6 is a method flowchart of a backlight regulating method according to Embodiment 3 of the present disclosure.
Figure 7:
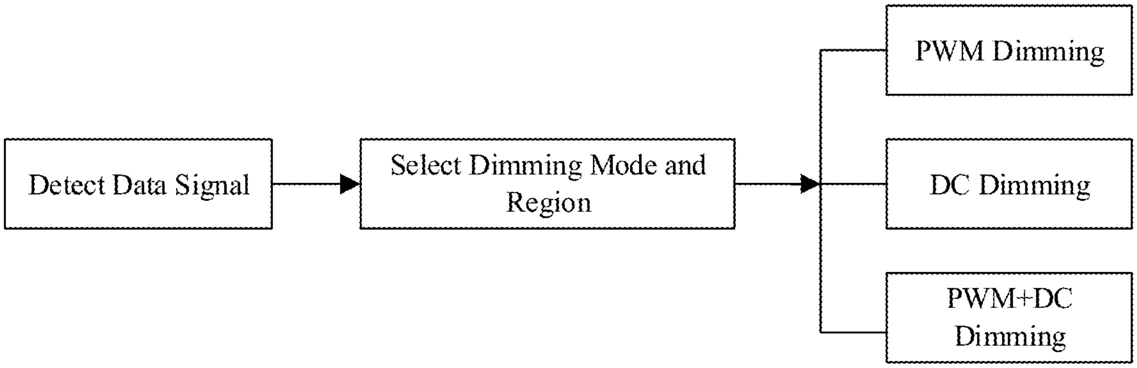
FIG. 7 is a flow block diagram of a backlight regulating method according to Embodiment 3 of the present disclosure.
Figure 8:
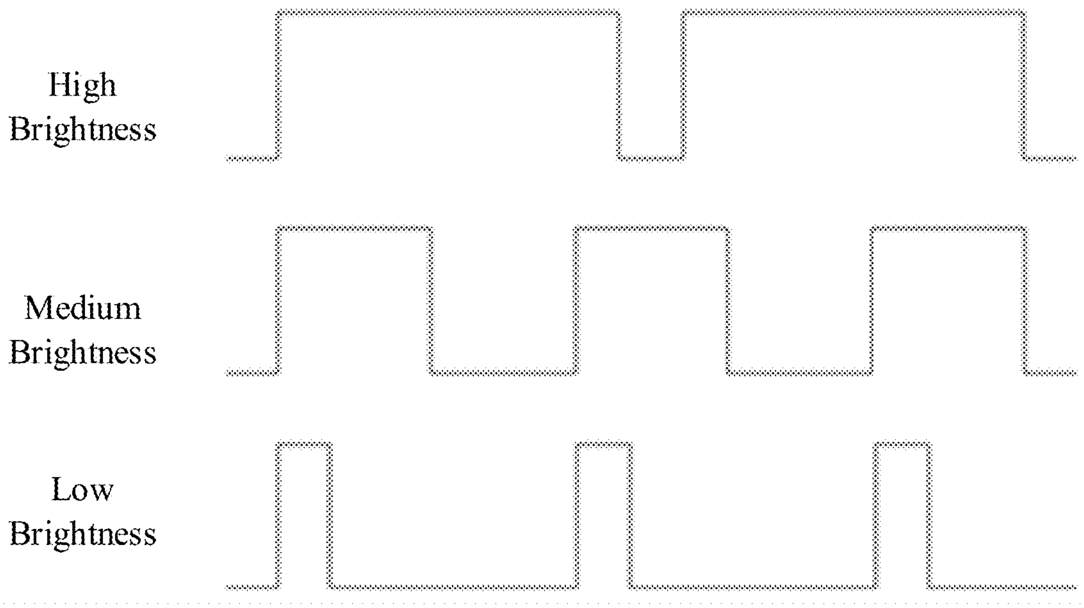
FIG. 8 is a schematic diagram of a PWM dimming signal at different brightness.
Figure 9:
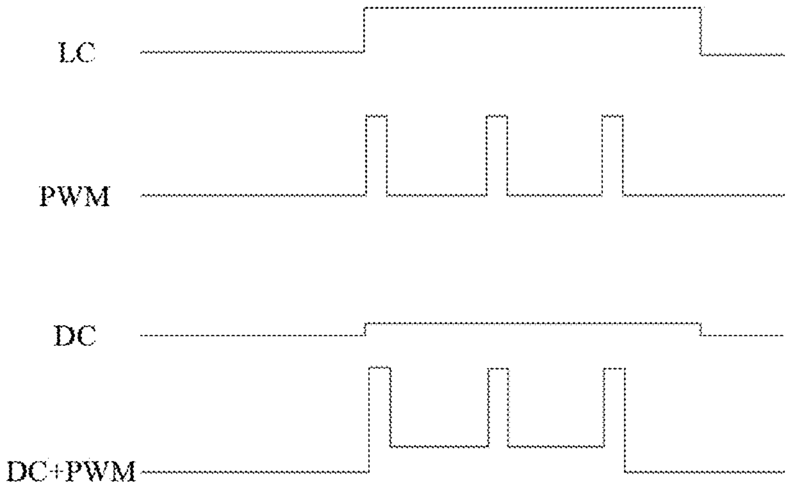
FIG. 9 is a schematic diagram of input and output signals of a backlight regulating circuit at a low brightness.
Figure 10:
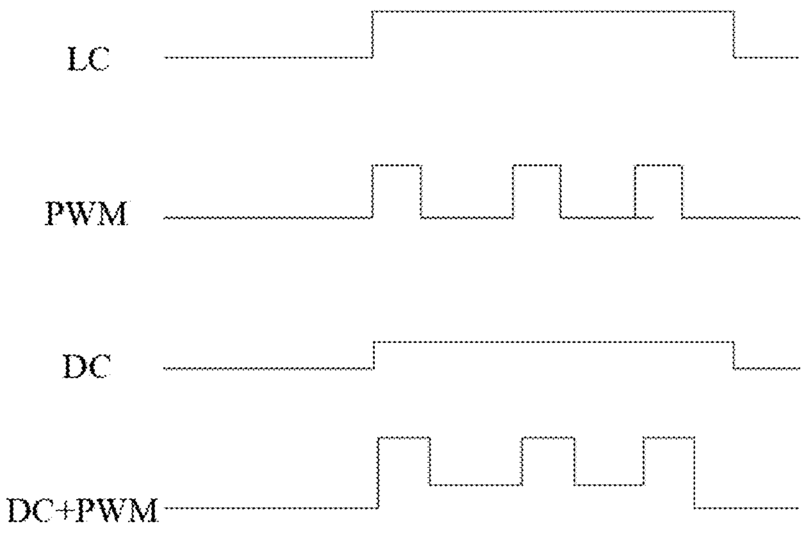
FIG. 10 is a schematic diagram of input and output signals of a backlight regulating circuit at a medium brightness.
Figure 11:
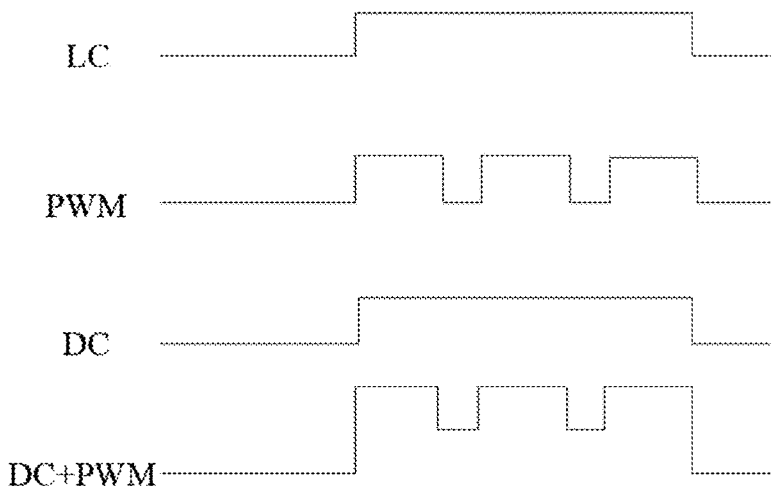
FIG. 11 is a schematic diagram of input and output signals of a backlight regulating circuit at a high brightness.

In this embodiment, a backlight control method is applied to the display apparatus in Embodiment 2. Referring to FIG. 6 and FIG. 7, the backlight control method includes:

- S100: detect a data signal and parse the data signal into a displayed image, and determine the type of the displayed image according to the dynamic range of the displayed image, where the displayed image is one of relatively low dynamic image, medium dynamic image and high dynamic image;
- S200: in a case that the displayed image is determined as the low dynamic image, control a voltage output by the logic circuit 220 to a control signal line 154 to be greater than or equal to a first voltage to make a first dimming circuit 110 conduct a PWM signal line 151 and a driving chip 140;
- S300: in a case that the displayed image is determined as the medium dynamic image, control the voltage output by the logic circuit 220 to the control signal line 154 to be greater than a second voltage and less than the second voltage to make the first dimming circuit 110 conduct the PWM signal line 151 and the driving chip 140 and make the second dimming circuit 120 conduct the DC signal line 152 and the driving chip 140; and
- S400: in a case that the displayed image is determined as the high dynamic image, control the voltage output by the logic circuit 220 to the control signal line 154 to be less than or equal to the second voltage to make the second dimming circuit 120 conduct the DC signal line 152 and the driving chip 140.

The displayed image may be divided into the low dynamic image, the medium dynamic image and the high dynamic image according to the dynamic range. The mainboard 300 detects the data signal, parses the data signal as the displayed image, and determines the type of the displayed image according to the dynamic range of the displayed image. In a case that the displayed image is determined as the low dynamic image, PWM dimming is adopted; in a case that the displayed image is determined as the medium dynamic image, PWM+DC dimming is adopted; and in a case that the displayed image is determined as the high dynamic image, DC dimming is adopted. The backlight assembly 100 may include a plurality of primary subregions 171. The dimming mode of each of the primary subregions 171 may be different.

The dimming mode may be flexibly switched among PWM dimming, DC dimming and PWM+DC mixed dimming according to the dynamic range of the displayed image, thereby reducing or eliminating flickering of the displayed picture, improving the display quality of the display apparatus, and reducing power consumption to a certain degree.

Referring to FIG. 8 to FIG. 11, in step S300, in a case that the displayed image is determined as the medium dynamic image and before the logic circuit 220 is controlled to output a voltage to the control signal line 154, the brightness of the displayed image can be obtained, and the voltage output by the logic circuit 220 to the control signal line 154 is regulated according to the brightness of the displayed image, thereby regulating the ratio of the signal of the PWM signal line 151 and the signal of the DC signal line 152 output to the driving chip 140.

That is, in a case that the displayed image is a low-brightness image, the ratio of the signal of the PWM signal line 151 is increased by regulating the voltage of the control signal line 154; and in a case that the displayed image is high-brightness image, the ratio of the signal of the DC signal line 152 is increased by regulating the voltage of the control signal line 154.

Before the logic circuit 220 is controlled to output the voltage to the control signal line 154, the brightness of the displayed image can be obtained, the voltage of the control signal line 154 is regulated according to the brightness of the displayed image, and the ratio of the signal of the PWM signal line 151 and the signal of the DC signal line 152 output to the driving chip 140 is adjusted, thereby reducing or eliminating flickering of the displayed picture, improving the display quality of the display apparatus, and reducing power consumption to a certain degree.

The terms "first", "second" and the like are used only for description and shall not be interpreted as an indication or implication of relative importance or an implicit indication of the number of technical features. Thus, the feature defined by "first" and "second" may explicitly or implicitly include one or more features. In the description of the present disclosure, "a plurality of" means two or more, unless otherwise specifically defined.

In the present disclosure, unless otherwise specified and limited, the terms such as "assembling" and "connection" should be understood in a broad sense, for example, it may be fixed connection, and may also be detachable connection, or integrated; it may be mechanical connection or may be electric connection; and it may be direct connection, may be indirect connection through an intermediate medium, and may be internal communication of two components or interaction relationship between two components. A person of ordinary skill in the art may understand specific meanings of the above-mentioned terms in the present disclosure based on the specific situation.

In the description of this specification, referring to the description of the terms such as "some embodiment" and "exemplarily" means that the specific feature structure, material or characteristics described in combination with this embodiment or example is included in at least one embodiment or example of the present disclosure. In this specification, the schematic representation of the above terms does not necessarily mean the same embodiment or example. Moreover, the particular features, structures, materials or characteristics described may be combined in any suitable manner in any one or more examples/implementations or examples. In addition, various embodiments or examples described in the specification, as well as features of various embodiments or examples, may be combined and combined by those skilled in the art without contradicting each other.

Although embodiments of the present disclosure have been shown and described above, it may be understood that the above embodiments are exemplary and are not to be construed as limiting the present disclosure. Changes, modifications, substitutions and variations of the above embodiments may be made by those skilled in the art; therefore, all changes or modifications made according to the claims and specification of the present disclosure should be within the scope covered by the present disclosure patent.

What is claimed is:

1. A backlight regulating circuit, comprising a first dimming circuit, connected to a scanning signal line, a PWM signal line and a driving chip, and configured to conduct the PWM signal line and the driving chip in response to the scanning signal line, wherein the backlight regulating circuit further comprises:

a second dimming circuit, connected to the scanning signal line, a DC signal line and the driving chip, and configured to conduct the DC signal line and the driving chip in response to a signal of the scanning signal line; and a selecting circuit, connected to a control signal line, the scanning signal line, the first dimming circuit and the second dimming circuit, wherein the first dimming circuit and the second dimming circuit are connected to the scanning signal line through the selecting circuit, and the selecting circuit is configured to proportionally distribute the signal of the scanning signal line to the first dimming circuit and the second dimming circuit in response to a control signal dynamically output by the control signal line according to an image.

2. The backlight regulating circuit according to claim 1, wherein the selecting circuit comprises a first transistor and a second transistor; one of the first transistor and the second transistor is a P-type transistor and the other one of the first transistor and the second transistor is an N-type transistor; a control terminal of the first transistor and a control terminal of the second transistor are connected to the control signal line; a first terminal of the first transistor and a first terminal of the second transistor are connected to the scanning signal line; a second terminal of the first transistor is connected to the first dimming circuit; and a second terminal of the second transistor is connected to the second dimming circuit.

3. The backlight regulating circuit according to claim 2, wherein the first transistor is the N-type transistor, and the second transistor is the P-type transistor; in a case that an output voltage of the control signal line is greater than or equal to a first voltage, the first transistor works in a saturation region and the second transistor works in a cut-off region; in a case that the output voltage of the control signal line is less than or equal to a second voltage, the first transistor works in the cut-off region and the second transistor works in the saturation region; and in a case that the output voltage of the control signal line is greater than the second voltage and less than the first voltage, the first transistor and the second transistor work in a variable resistance region.

4. The backlight regulating circuit according to claim 2, wherein the first dimming circuit comprises a third transistor; the third transistor is connected to the second terminal of the first transistor; a first terminal of the third transistor is connected to the PWM signal line; and a second terminal of the third transistor is connected to the driving chip.

5. The backlight regulating circuit according to claim 2, wherein the second dimming circuit comprises a fourth transistor; the fourth transistor is connected to the second terminal of the second transistor; a first terminal of the fourth transistor is connected to the DC signal line; and a second terminal of the fourth transistor is connected to the driving chip.

6. A display apparatus, comprising:

a backlight assembly, comprising a driving board, a light string, a driving chip, and a backlight regulating circuit, wherein the backlight regulating circuit, the light string and the driving chip are arranged on the driving board, the backlight regulating circuit, the driving chip and the light string are connected sequentially and the light string comprises a plurality of lamp beads connected in series;

wherein the backlight regulating circuit comprises:

a first dimming circuit, the first dimming circuit is connected to a scanning signal line, a PWM signal line and the driving chip, and configured to conduct the PWM signal line and the driving chip in response to the scanning signal line;

a second dimming circuit, connected to the scanning signal line, a DC signal line and the driving chip, and configured to conduct the DC signal line and the driving chip in response to a signal of the scanning signal line; and a selecting circuit, connected to a control signal line, the scanning signal line, the first dimming circuit and the second dimming circuit, wherein the first dimming circuit and the second dimming circuit are connected to the scanning signal line through the selecting circuit, and the selecting circuit is configured to proportionally distribute the signal of the scanning signal line to the first dimming circuit and the second dimming circuit in response to a control signal dynamically output by the control signal line according to an image.

7. The display apparatus according to claim 6, wherein the driving board comprises at least one primary subregion and at least one secondary subregion surrounding all subregions; each of the at least one primary subregion and the at least one secondary subregion comprises the driving chip and at least one of the light string, and the at least one primary subregion further comprises the backlight regulating circuit.

8. The display apparatus according to claim 6, further comprising a mainboard, a control assembly, a display panel and the backlight assembly, wherein the control assembly is connected to the mainboard, the display panel and the backlight assembly;

wherein the mainboard is at least configured to supply power to the control assembly and to detect a data signal; wherein the control assembly comprises a control circuit, a logic circuit and a power circuit, the control circuit is at least configured to control on and off of the light string; the logic circuit is at least configured to control the backlight regulating circuit according to the data signal detected by the mainboard, and the power circuit is at least configured to convert an input voltage of the mainboard to supply power to the backlight assembly and the display panel.

9. The display apparatus according to claim 6, wherein the selecting circuit comprises a first transistor and a second transistor; one of the first transistor and the second transistor is a P-type transistor and the other one of the first transistor and the second transistor is an N-type transistor; a control terminal of the first transistor and a control terminal of the second transistor are connected to the control signal line; a first terminal of the first transistor and a first terminal of the second transistor are connected to the scanning signal line; a second terminal of the first transistor is connected to the first dimming circuit; and a second terminal of the second transistor is connected to the second dimming circuit.

10. The display apparatus according to claim 9, wherein the first transistor is the N-type transistor, and the second transistor is the P-type transistor; in a case that an output voltage of the control signal line is greater than or equal to a first voltage, the first transistor works in a saturation region and the second transistor works in a cut-off region; in a case that the output voltage of the control signal line is less than or equal to a second voltage, the first transistor works in the cut-off region and the second transistor works in the saturation region; and in a case that the output voltage of the control signal line is greater than the second voltage and less than the first voltage, the first transistor and the second transistor work in a variable resistance region.

11. The display apparatus according to claim 9, wherein the first dimming circuit comprises a third transistor; the third transistor is connected to the second terminal of the first transistor; a first terminal of the third transistor is connected to the PWM signal line; and a second terminal of the third transistor is connected to the driving chip.

12. The display apparatus according to claim 9, wherein the second dimming circuit comprises a fourth transistor; the fourth transistor is connected to the second terminal of the second transistor; a first terminal of the fourth transistor is connected to the DC signal line; and a second terminal of the fourth transistor is connected to the driving chip.

13. A backlight regulating method, the backlight regulating method being applied to a display apparatus, the display apparatus further comprising a logic circuit, and the backlight regulating method further comprising:

detecting a data signal and parsing the data signal into a displayed image, and determining a type of the displayed image according to a dynamic range of the displayed image, wherein the displayed image is one of relatively low dynamic image, medium dynamic image and high dynamic image;

controlling, in a case that the displayed image is determined as the low dynamic image, a voltage output by the logic circuit to a control signal line to be greater than or equal to a first voltage to make a first dimming circuit conduct a PWM signal line and a driving chip;

controlling, in a case that the displayed image is determined as the medium dynamic image, the voltage output by the logic circuit to the control signal line to be greater than a second voltage and less than the first voltage to make the first dimming circuit conduct the PWM signal line and the driving chip and make a second dimming circuit conduct a DC signal line and the driving chip; and controlling, in a case that the displayed image is determined as the high dynamic image, the voltage output by the logic circuit to the control signal line to be less than or equal to the second voltage to make the second dimming circuit conduct the DC signal line and the driving chip;

wherein the first dimming circuit is connected to a scanning signal line, the PWM signal line and the driving chip, and is configured to conduct the PWM signal line and the driving chip in response to the scanning signal line;

wherein the second dimming circuit is connected to the scanning signal line, the DC signal line and the driving chip, and is configured to conduct the DC signal line and the driving chip in response to a signal of the scanning signal line; and wherein a selecting circuit is connected to the control signal line, the scanning signal line, the first dimming circuit and the second dimming circuit, wherein the first dimming circuit and the second dimming circuit are connected to the scanning signal line through the selecting circuit, and the selecting circuit is configured to proportionally distribute the signal of the scanning signal line to the first dimming circuit and the second dimming circuit in response to a control signal dynamically output by the control signal line according to an image.

14. The backlight regulating method according to claim 13, wherein in a case that the displayed image is determined as the medium dynamic image and before the voltage output by the logic circuit to the control signal line is controlled, a brightness of the displayed image is obtained, and the voltage output by the logic circuit to the control signal line is regulated according to the brightness of the displayed image so as to regulate a ratio of the signal of the PWM signal line and the signal of the DC signal line output to the driving chip.

15. The backlight regulating method according to claim 13, wherein the selecting circuit comprises a first transistor and a second transistor; one of the first transistor and the second transistor is a P-type transistor and the other one of the first transistor and the second transistor is an N-type transistor; a control terminal of the first transistor and a control terminal of the second transistor are connected to the control signal line; a first terminal of the first transistor and a first terminal of the second transistor are connected to the scanning signal line; a second terminal of the first transistor is connected to the first dimming circuit; and a second terminal of the second transistor is connected to the second dimming circuit.

16. The backlight regulating method according to claim 15, wherein the first transistor is the N-type transistor, and the second transistor is the P-type transistor; in a case that an output voltage of the control signal line is greater than or equal to a first voltage, the first transistor works in a saturation region and the second transistor works in a cut-off region; in a case that the output voltage of the control signal line is less than or equal to a second voltage, the first transistor works in the cut-off region and the second transistor works in the saturation region; and in a case that the output voltage of the control signal line is greater than the second voltage and less than the first voltage, the first transistor and the second transistor work in a variable resistance region.

17. The backlight regulating method according to claim 15, wherein the first dimming circuit comprises a third transistor; the third transistor is connected to the second terminal of the first transistor; a first terminal of the third transistor is connected to the PWM signal line; and a second terminal of the third transistor is connected to the driving chip.

18. The backlight regulating method according to claim 15, wherein the second dimming circuit comprises a fourth transistor; the fourth transistor is connected to the second terminal of the second transistor; a first terminal of the fourth transistor is connected to the DC signal line; and a second terminal of the fourth transistor is connected to the driving chip.

* * * * *